Patented Feb. 10, 1942

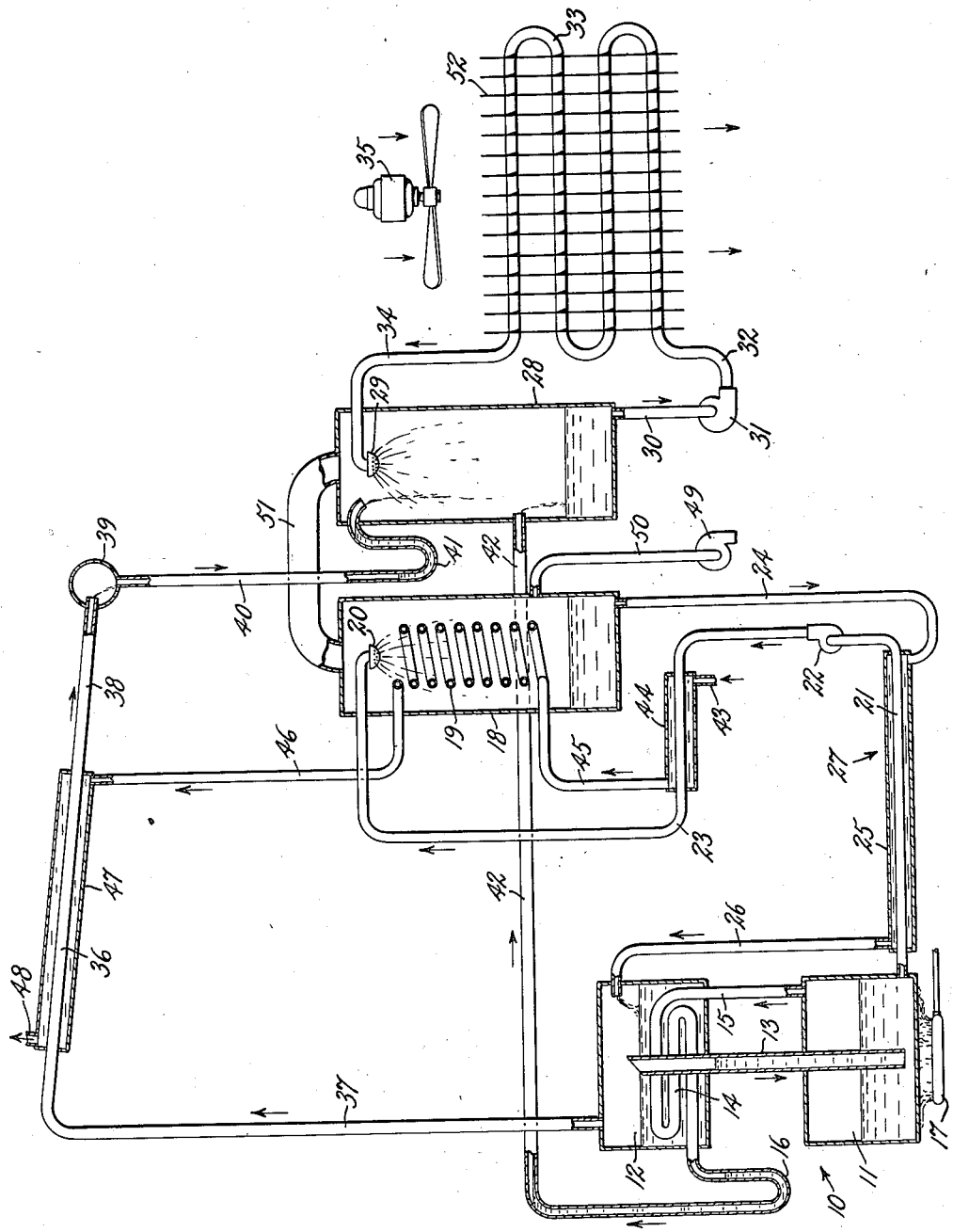

2,272,856

UNITED STATES PATENT OFFICE 2,272,856

REFRIGERATION

Albert R. Thomas, Evansville, Ind., assignor to Servel, Inc., New York, N. Y., a corporation of Delaware Application June 25, 1937, Serial No. 150,244

13 Claims. (Cl. 62—119.5)

My invention relates to absorption type refrigeration and it is an object of the invention to provide an improved method and apparatus for more efficiently producing refrigeration with water as refrigerant.

Water is cooled by vaporization and the vapor absorbed by absorption liquid which is dehydrated by expulsion of water vapor in a plurality of stages as set forth with particularity in the following description and accompanying drawing of which the single figure shows more or less diagrammatically a refrigeration system embodying the invention.

A generator or reactivator 10 includes a lower chamber 11 and an upper chamber 12. The lower part of chamber 11 is connected to the upper part of chamber 12 by a conduit 13. A condenser coil 14 is located in chamber 12 below the upper end of conduit 13. The condenser 14 may be arranged in thermal exchange relation with chamber 12 in any other suitable manner. The upper end of the condenser coil 14 is connected by a conduit 15 to the upper part of chamber 11. The lower end of the condenser coil is connected to one leg of a U-shaped liquid trap conduit 16. Chamber 11 is heated by any suitable means such as a gas burner 17.

An absorber 18 is provided with a cooling coil 19 above which is a spray head 20. The lower part of generator chamber 11 is connected by a conduit 21, a liquid pump 22, and a conduit 23 to the absorber spray head 20. The lower part of absorber 18 is connected by a conduit 24, a jacket 25, and a conduit 26 to the upper part of generator chamber 12. The jacket 25 is arranged around conduit 21, forming a liquid heat exchanger 27.

An evaporator 28 is provided in its upper part with a spray head 29. The lower part of evaporator 28 is connected by a conduit 30, a liquid pump 31, and a conduit 32 to the lower end of a coil 33. The upper end of coil 33 is connected by a conduit 34 to the evaporator spray head 29. A fan or blower 35 is arranged to cause flow of air to be cooled over the coil 33. The upper parts of evaporator 28 and absorber 18 are connected by a conduit 51.

One end of a condenser 36 is connected by a conduit 37 to the upper part of generator chamber 12. The other end of condenser 36 is connected to the evaporator 28 by a conduit 38, a receiver 39, a conduit 40, and a U-shaped liquid trap conduit 41. The evaporator 28 is also connected by a conduit 42 and liquid trap 16 to the condenser 14.

A path of flow for cooling water is provided by inlet conduit 43, a jacket 44 around conduit 23, a conduit 45, absorber cooling coil 19, a conduit 46, a jacket 47 around condenser 36, and outlet conduit 48. Any other suitable cooling system may be provided.

The above described refrigerating system contains water as refrigerant and an absorption solution such as potassium hydroxide, lithium chloride, or other suitable water absorbent. A vacuum pump 49 may be connected to the absorber 18 by a conduit 50, as shown, to keep the pressure in the system low by removing non-condensible gas.

During operation of the system, water is caused by pump 31 to flow from the bottom of evaporator 28 through conduit 30, pump 31, conduit 32, coil 33, conduit 34, and spray head 29 into the evaporator where the water falls back to the bottom in a spray or shower. Evaporation of water in evaporator 28 produces a refrigeration effect involving change in sensible heat of the water to latent heat of vaporization which lowers the temperature of the water which is passed through the coil 33. Air propelled by fan 35 is cooled by heat transfer to the cold water in coil 33 which may be provided with fins 52 to increase the heat transfer surface.

Water vapor passes from evaporator 28 through conduit 51 to absorber 18 where it is absorbed into solution with absorption liquid sprayed from head 20 into the water vapor. The heat of absorption is transferred to cooling water flowing through coil 19. Absorption solution enriched with water flows from the bottom of the absorber through conduit 24, liquid heat exchanger 27, and conduit 26 into upper chamber 12 of generator 10. Solution fills chamber 12 to the level of the open upper end of conduit 13 and overflows into this conduit and thence into the lower chamber 11. Weakened solution, that is, solution weak in water, flows from chamber 11 through liquid heat exchanger 27, pump 22 and conduit 23 to the absorber spray head 20.

In generator chamber 11, heated by the burner 17, water vapor is expelled from solution and passes through conduit 15 to condenser 14. Water vapor condenses to liquid in condenser 14 and the water flows into trap 16. The heat of condensation is transferred to the solution in chamber 12 which is rich in water, thereby causing expulsion of water vapor which flows through conduit 37 to condenser 36. Expulsion of water vapor takes place at a lower temperature in chamber 12 than in chamber 11 due to the lower pressure in chamber 12 and to the lower concentration of absorbent in chamber 12. In other words, the concentration or proportion of water in the absorption solution is higher in chamber 12 than in chamber 11.

Water vapor condenses to liquid in condenser 36 and the liquid flows through conduit 38, chamber 39, conduit 40, and trap 41 into the evaporator 28. Water also flows from trap 16 through conduit 42 into the evaporator 28. The pressure in the lower boiler chamber 11 and condenser 14 is greater than the pressure in the upper chamber 12 by the weight of the liquid column in conduit 13. The pressure in chamber 12 and condenser 36 is greater than the pressure in the evaporator 28 by the weight of the liquid column in trap 41. Therefore, the pressure in lower chamber 11 and condenser 14 is greater than the pressure in the evaporator 28 by the sum of the weights of the columns in conduit 13 and trap 41 so that the liquid column in trap 16 equals the sum of the heights of the columns in conduit 13 and trap 41.

The vacuum pump 49 or other suitable device removes non-condensible gas from the system so that a desired low pressure is maintained. Cooling water enters jacket 44 through conduit 43 to cool weak absorption solution in conduit 23 and then flows through conduit 45 into the absorber cooling coil 19, and then through conduit 46 to the condenser cooling jacket 47 for cooling condenser 36, and then through conduit 48 to waste or to a spray tower or other suitable heat dissipating device.

The number of generator stages may be increased to obtain greater efficiencies, the number of stages used being dependent upon the practical consideration of the cost of each stage with respect to the efficiency increase due to its addition, the latter becoming less as the number of stages increases.

Other changes and modifications may be made within the scope of the invention which is not limited as shown in the drawing and described in the foregoing part of this specification, but only as indicated in the following claims.

I claim:
1. A refrigeration system making use of evaporation of water at a low pressure and including an absorber in which water vapor is absorbed into solution in an absorption liquid, a generator in which water vapor is expelled out of solution by heat, said generator having a plurality of chambers, means for heating one of said chambers, and a condenser connected to said first chamber for heating another of said chambers, a condenser connected to said second generator chamber, and an evaporator connected to receive liquid from both said condensers.

2. A method of refrigerating which includes evaporating water in a place of low pressure, absorbing water vapor into absorption liquid in a place of absorption, conducting enriched absorption liquid to a first place of expulsion, conducting absorption liquid from said first place of expulsion to a second place of expulsion, heating liquid in said second place of expulsion to cause expulsion of water vapor from the liquid, conducting water vapor from said second place of expulsion to a place of condensation, transferring heat from said place of condensation to said first place of expulsion to cause expulsion of water vapor from liquid in said first place, connecting water vapor expelled in said first place to a second place of condensation, and conducting water from both said places of condensation to said low pressure place of evaporation.

3. A refrigeration system including an evaporator, an absorber, a plurality of generators, members including said evaporator forming a circuit for water, a conduit for conducting water vapor from said evaporator to said absorber, members including said absorber and said generators forming a circuit for absorption liquid in which said generators are arranged in series, means for heating one of said generators, a condenser connected to one of said generators and arranged to heat another of said generators, a conduit from said condenser for conducting liquid therefrom to said evaporator, a second condenser connected to said second generator, and a conduit for conducting liquid from said second condenser to said evaporator.

4. In the art of refrigeration by evaporation of water at a low pressure place and absorption of water vapor into solution, that improvement which consists in expelling water vapor from solution in a plurality of stages, condensing the expelled vapor from each of said stages, utilizing condensation of water vapor expelled in one stage to provide heat for expelling the water vapor in another stage, and conducting condensate of vapor from both said stages to said low pressure place of evaporation.

5. A method of refrigeration which includes evaporation of liquid in a place of evaporation, absorption of the resulting vapor into solution in a place of absorption, expelling vapor from solution in a plurality of places of expulsion, condensing vapor from each of said places of expulsion, utilizing condensation of vapor from one of said places of expulsion to provide heat for expelling vapor in another place of expulsion, and conducting the quantities of condensate of vapor from both said places of expulsion into the presence of each other in said place of evaporation.

6. A refrigeration system including an evaporator having all parts in open fluid communication, an absorber, a plurality of generators, a plurality of condensers, each connected to one of said generators, means for heating one of said generators, another of said generators being heated by one of said condensers, and said evaporator being connected to receive liquid from said condensers.

7. A method of refrigeration which includes evaporation of liquid in a place of evaporation, absorption of the resulting vapor into solution in a place of absorption, expelling vapor from solution in a plurality of places of expulsion, condensing separately vapor from each of said places of expulsion, utilizing condensation of vapor from one of said places of expulsion to provide heat for expelling vapor in another place of expulsion, conducting to said place of evaporation condensate formed by said condensing of vapor from both said places of expulsion, and carrying out all of said steps simultaneously.

8. Apparatus of the class described comprising means for circulating a mass of cooling water, means for utilizing a cooled strong hygroscopic solution to absorb vapor from said cooling water, structure for reconcentrating the resultant mixture of hygroscopic solution and water vapor by evaporating water vapor therefrom in stages, said structure including means for condensing the water vapor from one stage by heat exchange with the mixture in one of said stages, and means for cooling the reconcentrate for reutilization as a cooled strong hygroscopic solution.

9. Apparatus of the class described comprising means for circulating a mass of cooling water, means for utilizing a cooled strong hygroscopic solution to absorb vapor from said cooling water, structure for reconcentrating the resultant mixture of hygroscopic solution and water vapor by evaporating water vapor therefrom in stages, said structure including means for condensing the water vapor from one stage by heat exchange with the mixture in one of said stages, means for cooling the reconcentrate for reutilization as a cooled strong hygroscopic solution, and means for returning the condensed water vapor to said mass of cooling water.

10. Apparatus of the kind described comprising means for circulating a primary solution, means for transferring moisture from said primary solution to a secondary hygroscopic solution, means for evaporating moisture from said secondary solution, means for condensing some of the moisture so evaporated by heat exchange with said secondary solution, and means for cooling said secondary solution.

11. Apparatus of the kind described comprising means for circulating a primary solution, means for transferring moisture from said primary solution to a secondary hygroscopic salt solution, means for evaporating moisture from said secondary solution, means for condensing some of the moisture so evaporated by heat exchange with said secondary solution, means for returning moisture so condensed to said primary solution and means for cooling said secondary solution.

12. Apparatus of the class described comprising means for circulating a mass of cooling water, means for utilizing a hygroscopic solution to absorb vapor from said cooling water, structure for reconcentrating the resultant diluted hygroscopic solution by evaporating water vapor therefrom in stages, said structure including means for condensing water vapor from one of said stages by heat transfer to solution in another of said stages, and means for cooling the reconcentrate for re-utilization as an absorbent.

13. Apparatus as set forth in claim 12 which also includes means for returning the condensed water vapor to said mass of cooling water.

ALBERT R. THOMAS.